United States Patent [19]

Horvath

[11] Patent Number: 4,815,066

[45] Date of Patent: Mar. 21, 1989

[54] RECORDING AND/OR REPRODUCING APPARATUS

[75] Inventor: Othmar Horvath, Vienna, Austria

[73] Assignee: U.S. Philips Corporation, New York, N.Y.

[21] Appl. No.: 22,152

[22] Filed: Mar. 5, 1987

[30] Foreign Application Priority Data

Mar. 7, 1986 [AT] Austria .................................. 592/86

[51] Int. Cl.[4] ...................... G11B 17/04; G11B 19/16
[52] U.S. Cl. ..................................... 369/79; 220/264;
360/96.6; 360/99.06; 369/75.2
[58] Field of Search ..................... 369/75.2, 77.2, 77.1,
369/79; 360/96.5, 96.6, 97, 99; 220/262, 263, 264

[56] References Cited

U.S. PATENT DOCUMENTS

| | | | |
|---|---|---|---|
| 4,118,038 | 10/1978 | Watanabe | 369/77.1 |
| 4,412,320 | 10/1983 | Yamakawa | 369/79 |
| 4,539,668 | 9/1985 | Izumi et al. | 369/75.2 |
| 4,561,084 | 12/1985 | Satake et al. | 369/75.2 |
| 4,654,731 | 3/1987 | Fröschl et al. | 360/96.5 |
| 4,686,593 | 8/1987 | Watanabe et al. | 360/96.6 |

Primary Examiner—Steven L. Stephan
Attorney, Agent, or Firm—F. Brice Faller

[57] ABSTRACT

A recording and/or reproducing apparatus (1) includes a holder compartment (10) for a record carrier (2), a cover (13) which can be closed by hand against spring force to close the holder compartment (10), and a latching member (20) for retaining the cover (13) in the closed position, which latching member is movable by hand against spring force to release the cover (13). When the latching member (20) is actuated by hand to release the cover (13), electrical switching means (31) switches off electrical devices (30) of the apparatus (1) and keeps said devices switched off while the cover (13) is open. The switching means (31) includes a single switch (32) whose switching contacts (33, 34) are set to a first switching state when the cover (13) is closed, in which state the electrical devices (30) can be switched on, and which assume a second switching state when the cover (13) is open, in which second switching state the electrical devices (30) are switched off. The contacts (33, 34) are set to their second switching state via the latching member (20) when the latching member (20) is moved to release the cover (13).

2 Claims, 2 Drawing Sheets

RECORDING AND/OR REPRODUCING APPARATUS

The invention relates to a recording and/or reproducing apparatus having a holder compartment adapted to receive a record carrier and a movable cover for closing the holder compartment. The cover is movable by hand against the force of at least a first spring from an open position, in which it is open, to a closed position, in which it closes the holder compartment. A latching member retains the cover in its closed position, which member is movable by hand against the force of at least a second spring from a latching position, in which it retains the cover in its closed position, to a release position, in which it enables the cover to be moved out of its closed position. At least one electrical switching means switches off electrical devices of the apparatus before the cover is moved out of its closed position when the latching member is actuated to release the cover and keeps the electrical circuitry switched off, when the cover is not in its closed position.

A commercially available apparatus of this type is a reproducing apparatus for the reproduction of audio signals from a disk-shaped rotatable record carrier which can be scanned by means of a laser beam, which apparatus is generally referred as a Compact Disc player. The switching device in this known apparatus inter alia enables the motor drive means for the record carrier and the laser-scanning device for the record carrier to be switched on and off by means of the electrical devices of the apparatus. This switching device comprises two switches. Upon actuation of a key, which serves for moving the latching member so as to release the cover, the first switch is actuated by this key before the cover is moved out of its closed position, so that the drive means and the scanning device are switched off when the cover is still in its closed position. The second switch is actuated when the cover is moved out of its closed position, so that regardless of the switching state of the first switch the drive means and the scanning device remain inoperative when the cover is open. Switching off the drive means before the cover is moved out of its closed position ensures that the record carrier can be braked duly, thereby preventing the record carrier from flinging out of the apparatus and the record carrier and the drive means from being damaged. Switching off the drive means when the cover is open ensures that the drive means and the record carrier cannot be damaged when the record carrier is loaded into the holder compartment. Switching off the scanning device ensures that the laser does not emit a laser beam when the cover is open, thus reliably providing statutory radiation protection.

SUMMARY OF THE INVENTION

According to the invention the above disabling functions are performed in an equally reliable manner but with simpler and cheaper means. To this end the switching means comprises a single switch whose switching contacts are switched to a first switching state when the cover is in its closed position via an actuating member which is movable by the cover. In the first switching state the electrical devices can be switched on via the switch. The switching contacts occupy a second switching state when the cover is in its open position, in which second switching state the electrical devices are switched off via the switch. The switching contacts of this switch can be set to their second switching state by the latching member when the latching member is moved from its latching position to its release position. In this way only one switch performs the same disabling functions as the switching device comprising two switches in the known apparatus. The use of only one switch simplifies assembly and adjustment, is cheaper and requires less space.

In this respect it is to be noted that U.S. Pat. No. 4,032,971 describes an apparatus comprising a holder compartment for a record carrier, which compartment can be closed by means of a cover, and a latching member which can be actuated manually by means of a slide button and which serves to retain the cover in its closed position. This known apparatus also comprises a switching device with a single switch for switching on and off the drive means and the scanning device. The switching contacts of this switch can be actuated by the cover via a projection on this cover and an intermediate lever which is pivotally mounted in the apparatus. As a result of this the switching contacts of this switch cannot be actuated to disable the drive means and the scanning device until the cover has been moved out of its closed position. Consequently, the drive means and the scanning device are not disabled until the cover has been moved out of its closed position. The cover is retained in an intermediate position close to its closed position after it has been moved out of its closed position when the switching contacts are already actuated, in which intermediate position the record carrier is still protected, for a predetermined time interval which is adequate to allow the drive means to be braked properly. However, this requires the use of a comparatively intricate latching mechanism for the cover, which mechanism comprises the latching member, and to obtain said time interval a mechanical delay means for the latching member, which constitutes a considerable expenditure. In the apparatus in accordance with the invention the drive means is duly switched off, to prevent the record carrier from being flung out of the apparatus and the record and the drive means for this carrier from being damaged, without the use any additional means and with the aid of only one switch.

It is possible to use a switch which is stationary in the apparatus and whose switching contacts are constituted by two contact springs which cooperate with each other. One spring can be actuated by the actuating member which is movable by means of the cover and the other spring can be actuated by a further actuating member which is movable by means of the latching member. It is found to be very advantageous if the switch is arranged on the latching member and, when the latching member is in its latching position and the cover is in its closed position, the switching contacts of the switch are set to their first switching state by the cover via the actuating member which is movable together with the cover. When the latching member is moved from its latching position to its release position, the contacts become disengaged from the actuating member which is movable by means of the cover and then assume their second switching state. This enables a simpler and cheaper commercially available switch to be used. The switch may be constructed very simply and comprise only one adjustable switching limb, because the first switching state of the switching contacts is obtained by actuation of the switching limb via the actuating member which is movable by means of the cover and the second switching state of the switching contacts can be obtained by moving the entire switch by means of the latching slide in such a way that the switching contacts are disengaged from the actuating member.

The actuating member may comprise, an actuating slide which can be moved against spring force by the cover when this cover is closed. Alternatively, this actuating member may comprise a separate actuating projection which is connected to and projects from the cover. In an apparatus in which the cover comprises a latching hook which projects from the cover and which can be retained by the latching member which is in its latching position when the cover is in its closed position, it is found to be advantageous if the actuating member is a latching hook. This has the advantage that the latching hook is utilized for two functions.

DETAILED DESCRIPTION OF THE PREFERRED EMBODIMENTS

Figure 1:
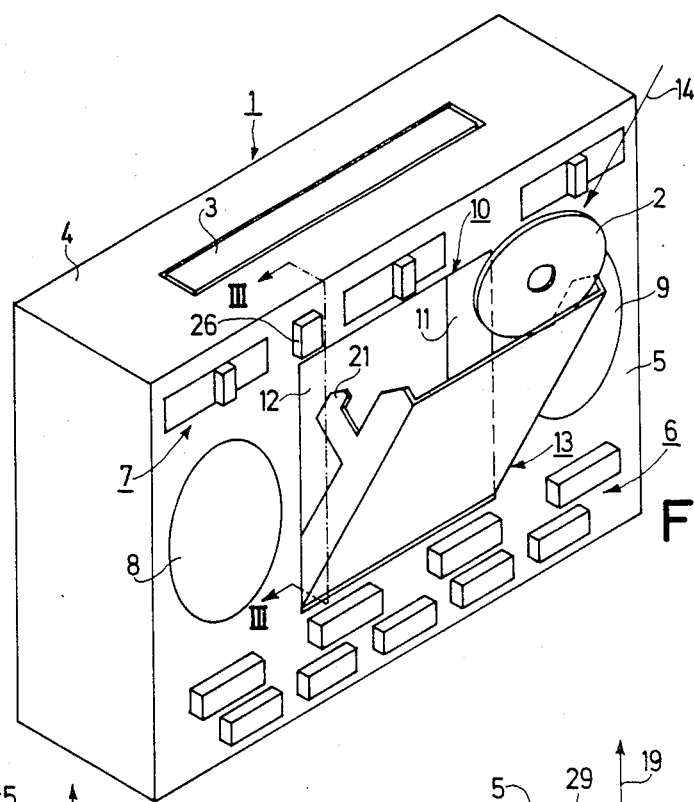
FIG. 1 is a perspective of a CD player.

FIG. 1 shows a portable compact disc player having a collapsible carrying handle 3 on its upper wall 4. On its front wall 5 the apparatus comprises a set 6 of nine keys which serve for selecting the modes of operation of the apparatus, a set 7 of three slide controls which serve for manually adjusting parameters of the audio signals to be reproduced, and two loudspeakers 8 and 9 for reproducing the audio signals.

Figure 2:
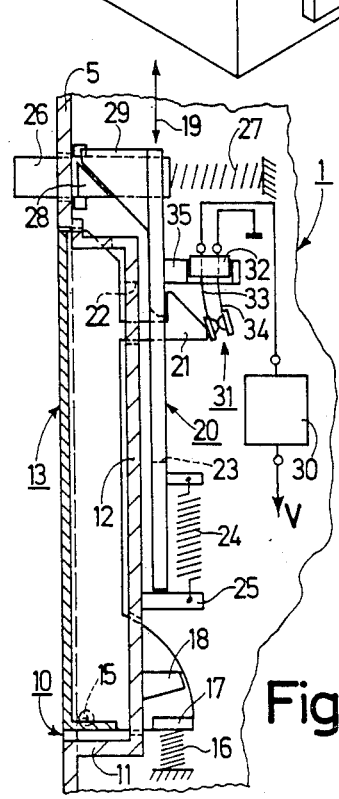
FIG. 2 is a section view of the CD player with the cover closed.
Figure 3:
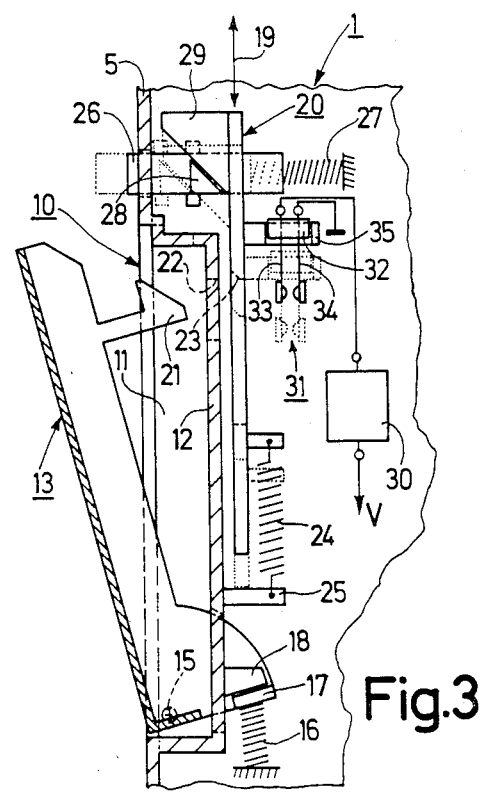
FIG. 3 is a section view of the CD player with the cover open.

Further the apparatus 1 comprises a holder compartment 10 for the disc 2, which compartment extends from the front wall 5 into the interior of the apparatus and is bounded by four side walls 11 and a bottom wall 12. From the interior of the apparatus a drive means comprising a drive spindle for rotating the disk 2 and a laser-scanning unit which is movable relative to the disc for scanning the disc project into the compartment 10. These two devices are not visible in FIG. 1, because they are hidden by a cover 13, which serves for closing the compartment 10. A disc 2 can be inserted into the cover in the direction indicated by the arrow 14, which positions the disc for cooperating with the drive means and the scanning device when the cover is closed. The cover 13 has a main wall and two side walls and is mounted so as to be pivotable about a spindle 15 which extends perpendicularly to the two side walls. From an open position shown in FIGS. 1 and 3, the cover 13 can be moved by hand against the force of two pressure springs 16, which each act on two projections 17 on the side walls of the cover 13, to a closed position shown in Fig. 2, in which it closes the holder compartment 10. Figures 2 and 3 show only one of the two pressure springs 16 and one of the two projections 17.

When the cover 13 is open the two projections 17 on this cover are urged against two positioning stops 18 under the influence of two pressure springs 16. When the cover 13 is closed it is retained against the force of the two pressure springs 16 by means of a latching slide 20 which in a manner not shown is slidably guided in the direction indicated by the arrow 19. A latching hook 21 projects from a side wall of the 13 and extends in the same plane as this wall, which hook when the cover 13 is closed projects through an opening 22 in the bottom wall 12 of the compartment 10 into the interior of the apparatus, where it extends through an opening 23 in the latching slide 20, the latching slide 20 engaging behind the hook-shaped end portion of the latching hook 21.

One end of a tension spring 24 acts on the latching slide 20 and the other end of this spring acts on a positioning projection 25 which projects from the bottom wall 12 of the compartment 10, thereby urging one end of the latching slide 20 against the positioning projection 25. When the latching slide 20 abuts with the positioning projection 25 the latching slide 20 is in its latching position illustrated in FIG. 2, The latching slide 20 can be moved by hand against the force of the tension spring 24 to a release position, shown in FIG. 3, in which it enables the cover 13 to be moved out of its closed position under the influence of the two pressure springs 16. As already stated moving the latching slide 20 to its release position is effected by hand by means of a push-button 26 which extends through the front wall 5 of the apparatus. Against the force of a pressure spring 27 the push-button 26 is movable from an off-position shown in FIG. 2 into an on-position shown in FIG. 3 and comprises an actuating projection 28 which cooperates with an actuating projection 29 of the latching slide 20. When the push-button 26 is actuated the latching slide 20 is moved against the force of the tension spring 24 via its actuating projection 28 and the actuating projection 29.

For switching on and off all the electrical devices 30 of the apparatus 1, which are represented symbolically by a box in FIGS. 2 and 3 and which are connected to a supply voltage V, an electrical switching device 31 is provided which, when the latching slide 20 is moved to release the cover 13, switches off the electrical devices 30 before the cover 3 is moved out of its closed position and which keeps the electrical devices 30 switched off when the cover 13 is not in its closed position. This switching device 31 includes switch 32, whose switching contacts 33 and 34 when the cover 13 is in its closed position are set to a first switching state, shown in FIG. 2, via an actuating member which in the present case is constituted by the latching hook 21. In the first or closed state the electrical devices 30 are switched on via the switch 32, When the cover 13 is in its open position contacts 33 and 34 occupy a second or open switching state, indicated in dotted lines in FIG. 3, in which the electrical devices 30 are switched off via the switch 32. The switching contacts 33 and 34 of the switch 32 can also be set to their open second state by means of the latching slide 20 when the latching slide 20 is moved from its latching position to its release position to release the cover 13 as is indicated in solid lines in FIG. 3. To this end the switch 32 is retained on the latching slide 20 by a mounting arm 35 which projects laterally from the latching slide. When the latching slide 20 is in its latching position and the cover 13 is in its closed position, as is shown in FIG. 2, the switching contacts 33 and 34 of the switch 32 are set to the closed first switching state by the cover 13 via the latching hook 21. When the latching slide 20 is moved from its latching position to its release position the switching contact 33 and 34 are disengaged from the latching hook 21 and then occupy their open second switching state, as is indicated in solid lines in FIG. 3.

In order to bring the disc 2 into the holder compartment 10 the cover 13 containing the disc is pivoted by hand from its open position to its closed position against the force of the two pressure springs 16. The inclined free end of the latching hook 21 then abuts against the inclined end wall of the opening 23 in the latching slide 20. As the cover 13 is further pivoted by hand the latching slide 20 is moved out of its latching position against the force of the tension spring 24 via the inclined end of the latching hook 21, so that the switch 32 is also moved. The latching slide 20 cannot be pulled back into its latching position by the tension spring 24 until the cover 13 has reached its closed position, so that the switch 32 is again moved along and its switching contacts 33 and 34 are set to the closed first switching state shown in FIG. 2 via the latching hook 21, which now cooperates directly with the switching contact 33. In this closed first switching state the power-supply circuit for the electrical devices 30 is closed and the electrical devices 30 of the apparatus and hence the drive means and the scanning device for the record carrier are switched on. Switching on is not effected until the disk 2 already cooperates with its drive means, thereby precluding damage to the drive means and the disc as a result of premature switching on of the drive means. Now a desired mode of operation can be selected and carried out after actuation of one of the keys of the set 6.

Actuating the push-button 26. moves the latching slide out of its latching position as that the switching contacts 33 and 34 disengage and the power-supply circuit for the electrical devices 30 is interrupted. Thus, switching off is effected after a first short portion of the travel of the latching slide 20, the cover 13 still being retained in its closed position. After the electrical devices 30 are thus switched off the drive means for the disc is braked immediately, which may be effected electronically or. As the latching slide 20 is moved further the cover 13 remains latched in its closed position. The cover 13 is not released and the two pressure springs 16 do not urge the cover out of its closed position into its open position until the latching slide 20 has reached its release position, causing the disc 2 to be moved along and to be disengaged from its drive means. When the cover 13 is open the user of the apparatus releases the push-button 26. Subsequently, the push-button 26 returns to its off-position under the influence of the pressure spring 27, the tension spring 24 pulling the latching slide 20 back into its latching position in which it abuts against the positioning projection 25. During this movement of the latching slide 20 carrying the switch 32 the switching contacts 33 and 34 remain in their open second switching state, in which the electrical devices 30 are switched off via the switch 32, because the latching hook 21 has been moved out of the path of movement of the switching contact 33, as is indicated by the dotted lines in FIG. 3. Thus, when the cover 13 is open the electrical devices 30 of the apparatus and hence the drive means and the scanning device for the disc remain switched off. Consequently, the laser of the scanning device does not emit a laser beam when the cover is open. By switching off the drive means for the disc while the cover is open, the disk and its drive means cannot be damaged when a disc is inserted into the apparatus.

The apparatus may also be slightly modified so that the main wall of the cover, which wall is flush with the front wall of the apparatus, comprises a portion through which the cover-release button extends. When the push-button of this apparatus is actuated the cover is kept in its closed position by hand via this portion of the main wall until the user releases the push-button. Since this manual release is always slightly delayed relative to the release by the latching slide, the time interval available for braking the drive means of the disc becomes longer.

Figure 4:
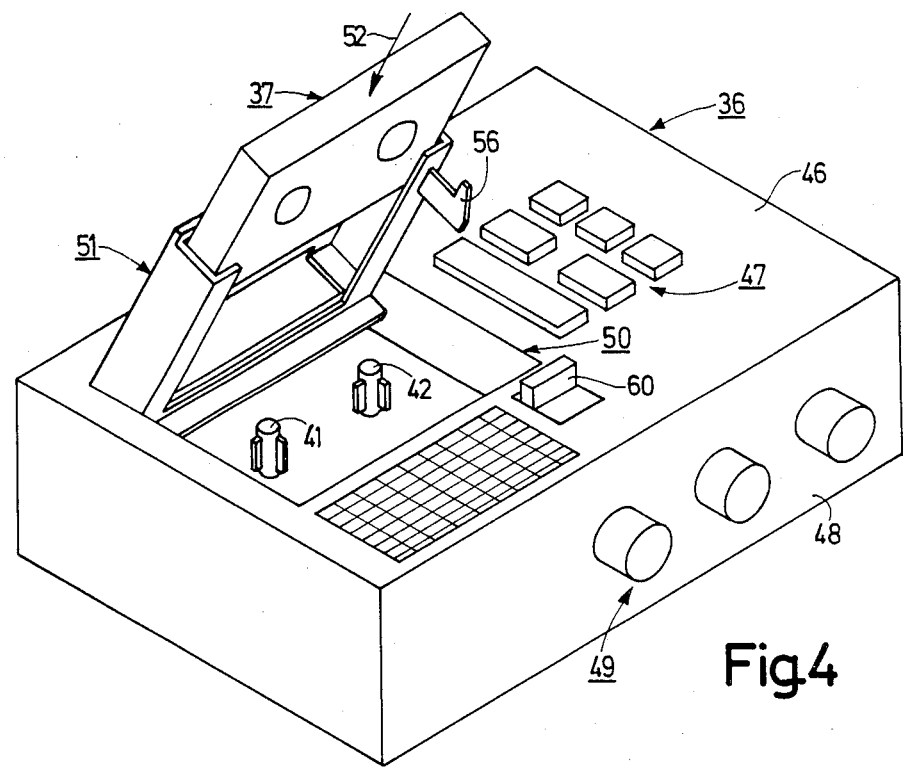
FIG. 4 is a perspective of a tape cassette player.
Figure 5:
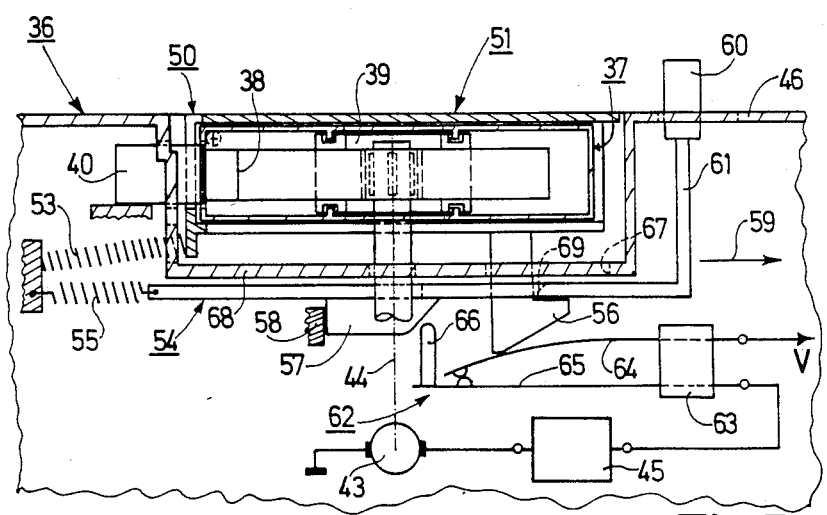
FIG. 5 is a section view of the cassette player with the cover closed.

FIGS. 4 and 5 show an apparatus 36 for recording and reproducing audio signals on/from a record carrier 38 in the form of a tape, briefly referred to hereinafter as "magnetic tape", contained in a cassette 37. The cassette 37 comprises two juxtaposed rotatable reel hubs 39, of which only one hub is visible in FIG. 5, and between which the magnetic tape 38 extends. The magnetic tape 38 extends along a long narrow side of the cassette 37 having openings for the passage of two magnetic heads 40, serve for erasing and for recording and reproducing audio signals. The magnetic tape is driven by driving the reel 39 in all the modes of operation, for which purpose the apparatus 36 comprises two rotatable winding spindles 41 and 42. For driving the winding spindles 41 and 42 there is provided a motor 43 which, via a mechanism 44 symbolically represented by dash-dot lines, selectively drives one of the two winding spindles 41 and 42 in opposite directions of rotation. The motor 43 is energized by a motor-supply circuit 45, which can be connected to a voltage supply V and which enables the driving torque, the speed and the direction of rotation of the motor 43 to be influenced. For selecting the modes of operation of the apparatus its upper wall 46 carries a set 47 of six keys. On its front wall 48 the apparatus further carries a set 49 of three rotary controls for manually adjusting parameters of the audio signals to be reproduced.

At the location of its upper wall 46 the apparatus 36 has a holder compartment 50 for receiving a cassette 37, which compartment extends into the interior of the apparatus. The two winding spindles 41 and 42 project from the interior of the apparatus into this compartment. A cover 51 is movable between an open position shown in FIG. 4, in which it is open to receive a cassette 37 inserted in the direction indicated by the arrow 52, and a closed position shown in FIG. 5 in which it closes the compartment 50 and a cassette 37 contained in the cover 51 is in an operating position in the apparatus. The cover 51 is moved from its open position into its closed position by hand against the force of a pressure spring 53 which acts on the cover.

The open position of the cover 51 is defined in the same way as in the apparatus 1 shown in FIGS. 1 to 3, but the stops provided for this purpose are not shown in FIGS. 4 and 5. In the same way as in the apparatus shown in FIGS. 1 to 3 the closed position of the cover 51 is defined by means of a latching slide 54, which is movable from a latching position shown in FIG. 5 into a release position, not shown, against the force of a tension spring 55 acting on it and which in its latching position engages behind a latching hook 56 which projects from the cover 51. The latching position of the latching slide 54 is defined in that an actuating projection 57 on this slide abuts against a fixed positioning rib 58 on the apparatus under the influence of the tension spring 55. The latching slide 54 is moved by hand from its latching position to its release position in the direction indicated by the arrow 59, for which purpose the apparatus is provided with a manually actuated sliding button 60, which is connected directly to the latching slide 54 via a limb 61.

For switching on and switching off the motor-supply circuit 45 and the apparatus 36 comprises an electrical switching device 62, which when the latching slide 54 is actuated to release the cover 51 switches off the motor-supply circuit 45 before the cover 51 is moved out of its closed position and which keeps the motor-supply circuit 45 switched off when the cover 51 is not in its closed position. The switching device 62 also comprises only one switch 63 whose switching contacts 64 and 65 are set to a closed first switching state, by means of a latching hook 56 by the cover 51 so that the motor-supply circuit 45 is connected to the voltage supply V via the switch 63 and is consequently switched on. When the cover 51 is in its open position the switching contacts 64 and 65 are in an open switching state in which the motor-supply circuit 45 is disconnected from the voltage supply V and is consequently switched off via the open switch 63. When the latching slide 54 is moved from its latching position to its release position the switching contacts 64 and 65 can be set to their open second switching state by the latching slide 54, in which the motor-supply circuit 45 is switched off via the switch 63. For this purpose the latching slide 54 has an actuating projection 57, in whose path of movement a switching limb 66 projects, which limb is connected to the switching contact 65 and via which the switching contact 65 is actuated by the latching slide 54 as it is moved in the direction indicated by the arrow 59, so that the two switching contacts 64 and 65 are set to their open second switching state. In this open switching state these two resilient switching contacts 64 and 65 are deflected out of their straight position, in which the two switching contacts also occupy an open switching state.

When the cover 51 is open both resilient switching contacats 64 and 65 are in their straight positions and the motor-supply circuit 45 is switched off, so that the motor 43, the drive means 44 and the winding spindles 41 and 42 are stopped. When the cover 51 is pivoted by hand from its open position to its closed position the latching hook 56 passes through a slot 67 in the bottom wall 68 of the holder compartment 50 and engages a slot 69 formed in the latching slide 54 and having an inclined bounding wall, the latching slide being moved in the direction indicated by the arrow 59 against the force of the tension spring 55 via the inclined free end portion of the latching hook 56. The actuating projection 57 then abuts against the switching limb 66 and actuates this limb so that the resilient switching contact 65 carrying the switching limb 66 is deflected away from the other switching contact 64 which is still in its straight position. Subsequently, the two switching contacts 64 and 65 remain in the open switching state. As the cover 51 is moved further the latching hook 56 deflects the switching contact 64 into the position shown in FIG. 5, the two switching contacts 64 and 65 remaining in their open state because the switching contact 65 has already been actuated and deflected. When the cover 51 has reached its closed position the latching slide 54 is pulled into its latching position by the tension spring 55. Briefly before the latching slide 54 reaches its latching position, the actuating projection 57 of the slide releases the switching limb 66, so that the switching contact 65 carrying the switching limb 66 resumes its straight position. The switching contact 64 is retained in its deflected position by the latching hook 56. The two switching contacts 64 and 65 then occupy their closed switching state shown in FIG. 5, in which the motor-supply circuit 45 is switched on. By actuating one of the keys of the set 47 it is now possible to select a mode of operation of the apparatus. The motor-supply circuit 45 is then operated to drive the motor 43 in conformity with the selected mode and the motor power is transmitted to one of the two winding spindles 41 and 42 via the drive means 44 to drive one of the two reel hubs 39 and consequently the magnetic tape 38. As the motor-supply circuit 45 is not switched on until the cover 51 is closed and latched via the switch 63, the winding spindles 41 and 42 cannot be driven until the cover is latched in its closed position. This guarantees that the winding spindles 41 and 42 engage the reel hubs 39 when the winding spindles are stationary, thereby precluding damage to the winding spindles and the reel hubs.

To remove inserted cassette 37, button 60 is slid by hand in the direction indicated by the arrow 59. As a result of this, the latching slide 54 is also moved in this direction via the limb 61, the actuating projection 57 of the slide already abutting against the switching limb 66 to move this limb after a short travel of the latching slide 54, so that the switching contact 65 carried by this limb is deflected out of its straight position to open the swtich 63. Consequently, the motor 43, if it has not yet been switched off by actuation of one of the keys of the set 47, is switched off after this short travel of the latching slide 54. As the latching slide 54 is moved further the switching contact 65 remains in its deflected position, so that the switch 63 remains open and the motor 43 remains switched off, the motor 43 and the drive means 44 for the winding spindles 41 and 42 being braked rapidly. When the latching slide 54 reaches its release position, the winding spindles 41 and 42 and the reel hubs 39 are stationary when the cover 51 is moved out of its closed position. Thus, the reel hubs 39 become disengaged from the winding spindles 41 and 42 when the spindles are stationary, and the latching hook 56 becomes disengaged from the switching contact 64, so that this contact resumes its straight position. When the cover has reached its open position the user may release the sliding button 60, the latching slide 54 being returned to its latching position under the influence of the tension spring 55. Towards the end of this sliding movement the actuating projection 57 releases the switching limb 66, so that the switching contact 65 also resumes its straight position, the two switching contacts 64 and 65 remaining in their open switching state.

In the present apparatus a part of the electrical devices, namely the motor-supply circuit, is switched on and off duly by means of only one switch. Thus, this apparatus has the same advantages as the apparatus shown in FIGS. 1 to 3.

Further embodiments are possible within the scope of the invention. For example, the record carrier may be inserted directly into the holder compartment of the apparatus, in which case the cover serves only for covering or closing the compartment. The cover may also cooperate with a leaf spring or a torsion spring; arranged to act on this cover only during a part of the movement of the cover from its closed position to its open position, so that the remainder of the movement of the cover to its open position must be effected by hand. Instead of a pivotable cover it is possible to use a cover which can be raised and lowered relative to the bottom wall of the holder compartment. The latching member may be a pivotable lever instead of a slide. In the apparatus in accordance with the first embodiment the switch switches on and off the entire electrical circuitry of the apparatus; the switch may also be used for switching on and off only the drive means and the scanning device of this apparatus. In the apparatus in accordance with the second embodiment the switch may not only switch on and off the motor-supply circuit but also further electrical devices, for example an electrical output amplifier stage or the entire audio processing circuitry. In the apparatus in accordance with the first embodiment the switch directly switches on the electrical devices which it can switch on and off; however, in series with this switch a further switch may be arranged to detect the presence of a disk in the holder compartment and to enable the electrical devices to be switched on only when a disk is present. In both embodiments the switches are closed when the cover is closed; however it is also possible to use switches which are opened when the cover is closed and whose switching states are scanned by means of a microprocessor which depending on the switching states turns the electrical devices on and off. The cover may have a separate actuating projection as the actuating member; further the switch may also be actuated by the cover via an intermediate part which is movably arranged in the apparatus, such as an intermediate lever or an intermediate slide. A button for actuating a latching member to release the cover may also be arranged on the cover.

What is claimed is:

1. A recording and/or reproducing apparatus comprising
   a holder compartment adapted to receive a record carrier,
   a movable cover for closing the holder compartment, said cover being movable by hand from an open position, in which the holder compartment is open, to a closed position, in which the holder compartment is closed,
   first spring means for urging said cover toward said open position,
   a latching member for retaining the cover in its closed position, said member being movable by hand from a latching position, in which it retains the cover in its closed position, to a release position, in which the cover can move from its closed position,
   second spring means for urging said latching member toward said latching position,
   an electrical switch which is switchable between a first switching state, in which power to the apparatus is on, and a second switching state, in which power to the apparatus is off, which switch is arranged on said latching member, which switch is in said second state when said cover is open, which switch is in said second state when said latching member is in its release position,
   an actuating member which is movable by said cover, said actuating member switching said switch to its first switching state when said cover is in the closed position and said latching member is in the latching position, said actuating member disengaging said switch so that said switch assumes its second switching state when said cover is in the closed position and the latching member is moved from the latching position to the release position.

2. An apparatus as claimed in claim 1 in which the cover comprises a latching hook which projects from said cover and which is retained by the latching member which is in its latching position when the cover is in its closed position, characterized in that the actuating member which is movable by means of the cover is constituted by the latching hook.

* * * * *